United States Patent Office 3,354,064
Patented Nov. 21, 1967

3,354,064
METHOD FOR CHANGING THE PHYSICAL CHARACTERISTICS OF AN ARTICLE BY ELECTRON BOMBARDMENT
Eugene C. Letter, Penfield, N.Y., assignor to Bausch & Lomb Incorporated, Rochester, N.Y., a corporation of New York
No Drawing. Filed Mar. 30, 1964, Ser. No. 355,957
13 Claims. (Cl. 204—157.1)

ABSTRACT OF THE DISCLOSURE

A method for changing the physical or optical characteristics of a transparent article or film such as glass or a dielectric coating having fluoride and reducible lead ions therein by electron bombardment thereof.

---

This invention relates to a novel method for changing the physical and/or optical characteristics of an article and more particularly to a novel method for producing color of relatively high density.

Glasses which contain certain metals in the ionic state have been subjected to reducing agents such as hydrogen at elevated temperatures, to thereby chemically reduce the metal ions to the elemental state. This process has been used for the commercial production of scales and reticles by exposing selected areas of a glass to the reducing atmosphere. Due to the limited penetration of the hydrogen into the glass structure, the reduction takes place only in the surface of the glass. Accordingly the reduced layer is extremely thin. Even though, there is only relatively slight penetration, the absorption of the reduced lead color centers is high, and optical densities in excess of four have been obtained. More serious limitations are also present, for example, in lead containing glasses, the aforementioned reduction is relatively slow and lacking flexibility.

One approach to decorating glassware by high energy radiation is disclosed in the U.S. patent of Billian 2,746,193. That disclosure teaches the use of relatively high energy, for example, three million volts and subjecting portions of the glass to the high energy radiation to thereby ionize those portions to produce an amber or brown color. In this process lead shields are used for masking those portions which are to remain clear.

The high energy requirements of such systems produce numerous problems. For example, lead shields are required for masks, and there is an inherent X-ray hazard. The images produced by such processes fade at room temperature. Furthermore, exposure to light or relatively high temperature increases the rate at which the image fades. In addition, the presence of cerium in the glasses inhibits coloration by the aforementioned processes.

The recent increase in interest relating to changing the color in preselected areas of transparent elements has been stimulated by the need for rapid information storage systems, as well as the demands of a competitive commercial market for decorated articles. For example, color changes are useful for recording purposes or information storage as well as decorations, masking, filtering and shuttering operations. In many cases the operations require extremely high speeds, and therefore preclude the use of hydrogen reduction at high temperatures, as well as these processes which employ extremely high energy requirements. In many cases, it is also desirable to utilize a durable base such as glass, rather than film or plastic materials for storing information or as the base material for decorations, filters etc.

Electron beams have low deflection inertia, high energy and high resolution. The beams are relatively flexible i.e. they may be deflected and controlled easily and rapidly with electrical signals. Furthermore, their energy density is relatively high so that writing times may be relatively short. Accordingly, it is desirable to incorporate electric beams for recording picture elements or information bits. One approach to utilize electric beams for recording purposes is disclosed by the article "Thermo Plastic Recording" by William E. Glenn and J. Edmond Wolfe which appeared in "International Science and Technology," June 1962, pages 28–35.

The present invention is directed to a method for changing the physical characteristics of an object. For example, a novel method disclosed herein may be used to change the color of a transparent article such as glass or a dielectric coating. The article such as glass may be used in many cases wherein a thermoplastic material would be unsatisfactory. Advantageously, the method produces a relatively opaque color which may be permanent or reversible according to different embodiments of the invention. Furthermore, the energy requirements are relatively low so that a cathode ray tube or a thermionic electron gun may be utilized to produce the color changes in the preselected areas with a high degree of resolution. In other cases masking such as photo-emulsions may be utilized for producing the desired resolution.

Various applications for the novel methods disclosed herein relate to the production of optical scales, reticles, gratings, thin film circuits, filter elements, electron sensitive films, photosensitive elements as well as data storage or recording.

The use of an electron beam further allows for maximum control of the predetermined areas as well as providing a relatively rapid response to changes in data. In some cases for example, information may be stored for computer systems wherein the speed of recording should be maximized. In other cases it is possible to change the electrical properties of the preselected areas to thereby produce semi-conductor properties in a dielectric body.

Briefly, the novel method for changing the physical or optical characteristics of an article includes the step of providing an article having reducible lead ions therein, and reducing the lead ions by subjecting the article to electron bombardment. According to the preferred embodiment of the invention predetermined areas of the article are subjected or exposed to a beam of electrons.

An image may be produced in a glass or dielectric film by means of the methods disclosed herein. Generally a predetermined area on a glass article or a coated substrate are subjected to the effects of electron bombardment. For example, the article may comprise a lead fluosilicate glass or a lead fluoride coating on a suitable substrate. For purposes of illustration, the article will be described as transparent in the natural state, however, as set forth hereinafter, the glass or substrate may be opaque in the natural state for various applications.

While the invention is described with reference to lead fluosilicate glass and lead fluoride it is not intended to limit the invention to specific compositions. Many and various compositions which contain lead ions together with fluorine ions will produce the unusual results when treated according to the methods disclosed herein. The electron bombardment reduces the lead ions to their elemental state to thereby change the physical characteristics of the article.

The electron bombardment may be produced by various means. For example, a thermionic electron gun and electric discharges may be used as a source of electrons. Glass compositions such as $SiO_2 \cdot PbO \cdot \frac{1}{2}PbF_2$ were found to form reduced lead centers by being exposed to electron beams. AC and DC gaseous discharges and spark discharges over a wide range of conditions also produced the reduced lead centers. Voltages ranged from 100 to 60,000 volts. The reduction took place at room temperature with the higher voltages and at 100° to 200° C. with the lower voltages. A visible image was also obtained within less than 10 seconds at a current of less than 100 microamperes and 30,000 volts. The coloration obtained by the electron bombardment ranged from light brown to black and optical densities of 4/micron were obtained.

Electron guns producing focused beam power densities in excess of 100,000 watts/cm.$^2$ at current densities in excess of 10 amp/cm.$^2$ are available. At this current density a detectable image may be produced within a sufficiently short time to satisfy the speed requirements of many computers. Furthermore, the resolution obtained by means of focused electron beam reduction of lead ions is satisfactory for most recording applications.

It is presently thought that the adaptation of an electron gun for ruling purposes will provide a versatile ruling process wherein labor costs will be reduced and resolution and quality improved. This approach should also make it possible to produce a large range of colors, optical densities, reflectivities and refractive indices. The ruling may be carried out by direct electron beam writing by computer control or by high resolution video scanning techniques. Other suitable methods include the use of an electron beam from a photosensitive cathode and optical image control by ultraviolet, visible or infrared rays which are detected through an image tube, optical or electronic lenses. High precision masking by means of photo resists or a contact discharge from a conducting master of proper relief might also be utilized.

The presently preferred materials comprise a lead fluoride coating on a glass substrate. Other substrates may be utilized without affecting the changes in the lead fluoride film. The contrast may be improved for a given exposure by depositing the lead fluoride film on an aluminum layer. For coating purposes a suitable substrate such as a glass plate is cleaned and an opaque aluminum film is deposited thereon by conventional vacuum techniques. For example, a vacuum of about $1 \times 10^{-5}$ mm. Hg, is obtained and the aluminum is evaporated from a tungsten source. The source would be subjected to a sufficient voltage to evaporate the aluminum, for example, 5–20 volts at about 20 amps. After a suitable layer i.e. a layer of the desired opacity of aluminum has been deposited, the lead fluoride is deposited onto the aluminum layer. The lead fluoride may be deposited at about $1 \times 10^{-4}$ to $1 \times 10^{-5}$ mm. of Hg from a small boat. The boat may comprise tungsten or molybdenum. The deposition is made by placing the lead fluoride in the boat and heating the boat by subjecting it to a voltage of 5–20 volts at 20 amps. If a larger boat is used the current would be increased to about 50 to 100 amps. A relatively thick layer of lead fluoride should be built up for maximizing the effect of coloration by the reducing process.

The combination of various layers of aluminum and other metals together with dielectrics such as $MgF_2$, $SiO_2$ and others has been used for forming interference films. It is presently proposed to make interference films utilizing a lead fluoride film wherein the index of refraction may be changed by subjecting the film to electron bombardment to thereby change the optical characteristics thereof.

The color produced in both the lead fluoride films and lead fluosilicate have been found to be permanent. There appears to be little or no effect from exposure to heat or light. For example, the color centers are permanent even though the glass is heated above its melting point. A reversible color may be produced by providing a lead fluosilicate glass and coating the surfaces of the glass with a hard dielectric film. For example, a lead fluosilicate glass article, or a substrate having a lead fluoride coating thereon may be coated with a dielectric layer such as a one quarter wavelength thick $MgF_2$ layer by conventional vacuum techniques. The $MgF_2$ may for example be evaporated from a tungsten boat at a pressure of about $1 \times 10^{-5}$ mm. of Hg, and 5 to 20 volts from a small tungsten boat. The current for a small tungsten boat would be approximately 20 amps. The dielectric film may be hardened by heating it at about 370° C. for a period of about ½ hour. The coated surface is then exposed to a beam of electrons in the order of 50–100 kv. to produce reduced lead color centers, which can be reversed by heating to a temperature of about 100–200° C. for five minutes. The reversing process will also take place at room temperature. For example, a significant reduction in intensity was obtained in about 12 hours.

Electronic circuits as well as n-type semiconductors may also be produced by subjecting lead fluosilicate glass to an electron bombardment. Reducing the lead ions in the glass by means of an electron beam has been found to change the electrical characteristics of the glass. In other cases a metallic film such as copper, silver etc. may be chemically deposited over the image to obtain predetermined optical or physical properties. In other cases the reduced image may be chemically etched to thereby produce an optical element such as a relief decoration or grating.

The predetermined areas which are to be reduced may be exposed by a controlled beam of electrons or may be exposed through a suitable mask. One approach is to use a photosensitive mask such as the commercially available Kodak Photo Resist. The photo resist is applied to the surface of the article and light hardened by exposure to ultraviolet light through a suitable mask. The mask covers the predetermined area, so that, the unhardened resist may be removed by washing with a suitable solvent such as trichlorethylene. The light hardened resist is then heated to complete the hardening thereof. The surface is then exposed to an electron bombardment such as a gaseous discharge to reduce the lead ions in the unmasked predetermined areas.

While the invention has been described in connection with several preferred embodiments, it should be understood that the methods disclosed herein may be modified without departing from the scope of the claims.

What is claimed is:

1. A method for changing the physical characteristics of an article comprising the step of providing an article having fluoride and reducible lead ions therein and the step of reducing the lead ions by subjecting the article to electron bombardment.

2. A method for changing the optical characteristics of an article comprising the step of providing an article containing fluoride and reducible lead ions and subjecting predetermined areas of the article to a beam of electrons to thereby reduce the lead ions.

3. A method for changing the optical characteristics of an article comprising the step of producing an article having fluoride and reducible lead ions therein and the step of exposing predetermined areas on the article to electron bombardment.

4. A method for changing the physical characteristics of an article comprising the step of providing an article, the step of coating a surface of the article with lead fluoride, and the step of exposing the lead fluoride coating to electron bombardment.

5. A method for changing the optical characteristics of an article according to claim 4 in which the electron bombardment has an energy of $\frac{1}{10}$ to 60 kilovolts.

6. A method for changing the physical characteristics of an article comprising the step of providing an article, the step of coating a surface of the article with lead fluoride, and the step of writing on the coating by controlling a beam of electrons.

7. A method for producing a permanent amber to black coloration in an article comprising the step of providing a lead fluosilicate glass, and the step of exposing the lead fluosilicate glass to an electron bombardment.

8. A method for changing the physical characteristics of an article comprising the step of providing an article having the fluoride and reducible lead ions therein, sealing a surface of said article by coating the surface with a dielectric film, hardening the dielectric film and reducing the lead ions by subjecting the surface of the article under the hardened film to electron bombardment.

9. A method for changing the physical characteristics of an article comprising the step of providing an article having fluoride and reducible lead ions therein, coating said article with a thin film of magnesium fluoride by vacuum deposition, hardening the magnesium film by heating the film to a temperature of about 100 to 200° C. for approximately thirty minutes and exposing the article to a beam of electrons to thereby reduce the lead ions.

10. A method for changing the physical characteristics of an article comprising the step of providing a substrate, the step of coating the substrate with lead fluoride, and the step of reducing the lead ions in the coating by exposing the coating to a beam of electrons.

11. The method for changing the physical characteristics of an article comprising the step of providing an article having fluoride and reducible lead ions therein, the step of masking portions of said article and the step of exposing the unmasked portions to electron bombardment.

12. A method for changing the physical characteristics of an article comprising the step of providing an article having fluoride and reducible lead ions therein and the step of reducing the lead ions in predetermined areas on the article by a contact discharge.

13. A method for changing the physical characteristics of an article comprising the step of providing an article having fluoride and reducible lead ions therein and the step of reducing the lead ions by subjecting the article to a gaseous discharge.

References Cited

UNITED STATES PATENTS

| 2,465,713 | 3/1949 | Dimmick | 117—93.3 |
| 2,746,193 | 5/1956 | Billian | 204—157.1 |

FOREIGN PATENTS

| 754,101 | 8/1956 | Great Britain. |

HOWARD S. WILLIAMS, *Primary Examiner.*